(12) United States Patent
Tomaru

(10) Patent No.: US 7,756,385 B2
(45) Date of Patent: *Jul. 13, 2010

(54) ANTISQUEEZED LIGHT GENERATOR

(75) Inventor: Tatsuya Tomaru, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 519 days.

This patent is subject to a terminal disclaimer.

(21) Appl. No.: 11/746,687

(22) Filed: May 10, 2007

(65) Prior Publication Data

US 2007/0297810 A1     Dec. 27, 2007

(30) Foreign Application Priority Data

Jun. 23, 2006    (JP)    ............... 2006-173286

(51) Int. Cl.
*G02B 6/00*     (2006.01)

(52) U.S. Cl. ................. 385/147; 385/123; 385/901; 398/182; 398/200; 398/201

(58) Field of Classification Search ............ 385/123, 385/147, 901; 398/182, 200, 201
See application file for complete search history.

(56) References Cited

U.S. PATENT DOCUMENTS

2008/0085121 A1 * 4/2008 Tomaru ............ 398/138

FOREIGN PATENT DOCUMENTS

JP     2006-191410     7/2006

OTHER PUBLICATIONS

Nicolas Gisin, et al.; Quantum cryptography; Reviews of Modern Physics, Jan. 2002; pp. 145-195; vol. 74, No. 1.

Geraldo A. Barbosa, et al.; Secure Communication Using Mesoscopic Coherent States; Physical Review Letters; Jun. 6, 2003; pp. 227901-1-227901-4; vol. 90, No. 22.

Tsuyoshi Nishioka, et al.; How much security does Y-00 protocol provide us?; Physics Letters A 327; 2004; pp. 28-32.

Ling-An Wu, et al.; Squeezed states of light from an optical parametric oscillator; Optical Society of America; Oct. 1987; pp. 1465-1475; vol. 4, No. 10.

Takuya Hirano, et al.; Broadband squeezing of light by pulse excitation; Optics Letters; Oct. 15, 1990; pp. 1153-1155; vol. 15, No. 20.

M. Shirasaki, et al.; Squeezing of pulses in a nonlinear interferometer; Optical Society of America; Jan. 1990; pp. 30-34; vol. 7, No. 1.

C. X. Yu, et al.; Soliton squeezing at the gigahertz rate in a Sagnac loop; Optical Letters; May 15, 2001; pp. 669-671; vol. 26, No. 10.

(Continued)

*Primary Examiner*—Jennifer Doan
(74) *Attorney, Agent, or Firm*—Antonelli, Terry, Stout & Kraus, LLP.

(57) ABSTRACT

An antisqueezed light generator system is built with only the components for optical communications with long-term reliability. A cw-LD light is made pulses by an intensity modulator and amplified by an optical amplifier. The amplified optical pulses are made short by high-order soliton pulse compression effect at a first optical fiber and peak power is increased. A fluctuation is expanded in a phase direction through propagation in a second optical fiber. Because an initial fluctuation is amplified by the optical amplifier, the fluctuation expanded in the phase direction is increased to the extent of the amplification and sufficient antisqueezing strength can be obtained.

16 Claims, 9 Drawing Sheets

OTHER PUBLICATIONS

M. J. Werner; Quantum Soliton Generation Using an Interferometer; Physical Review Letters; Nov. 9, 1998; pp. 4132-4135; vol. 81, No. 19.

S. Schmitt, et al.; Photon-Number Squeezed Solitons from an Asymmetric Fiber-Optic Sagnac Interferometer; Physical Review Letters; Sep. 21, 1998; vol. 81, No. 12.

* cited by examiner

ANTISQUEEZED LIGHT GENERATOR

CROSS-REFERENCE TO RELATED APPLICATION

The present application claims priority from Japanese patent application No. JP 2006-173286 filed on Jun. 23, 2006, the content of which is hereby incorporated by reference into this application.

TECHNICAL FIELD OF THE INVENTION

The present invention relates to an antisqueezed light generator and in particular to quantum communications, quantum cryptography, and optical communications.

BACKGROUND OF THE INVENTION

A request for confidentiality in communications has been an eternal theme from ancient times through the future, and in the recent network society, the request has been secured by development of cryptology. Security of a public key cryptosystem etc. which are presently prevalent is based on the fact that it takes unrealistically long time to decipher the ciphertext, but since computer technologies continue advancing steadily, the security of the public key cryptosystem etc. is not always promised into the future. On the other hand, quantum cryptography which is currently actively studied has security promised by physical laws and even if the technology advances, its security will not be broken and realization of such security has been desired.

The quantum cryptography with the highest possibility to realization at present is a quantum key distribution system using faint LD light (Non-Patent Document 1: N. Gisin, G. Ribordy, W. Tittel, and H. Zbinden, Reviews of Modern Physics 74, 145-195 (2002)). This system uses the quantum mechanical law for sharing a common key required between a sender and a receiver, and carries out general cipher communications after the common key is shared. In a process to share the common key, a dedicated optical line is used, and one signal is composed with faint light in which the number of photons is one or less, whereby a random number signal is transmitted. Because the number of photons in one signal is one or less, even if eavesdropping occurs, the legitimate receiver can discover the fact of the eavesdropping. Therefore, the legitimate receiver can establish the common key by using only the random number data that is deemed to be received safely without eavesdropping. The security of the system is proven even cryptographically, but the system requires a dedicated line and, in addition, because the number of photons is one or less for one signal, the signal is extremely susceptible to transmission loss and, for example, when 100 km transmission is conducted, a key generation rate becomes about several bps. Due to these defects, it is assumed that introduction of the quantum key distribution system using the faint LD light would be restricted to limited applications.

Against this, Yuen et al. have proposed a quantum mechanical system which do not only distribute keys but also transmits signals themselves by use of mesoscopic number of photons ("mesoscopic" means an intermediate between "macroscopic" and "microscopic") (Non-Patent Document 2: G. A. Barbosa, E. Corndorf, P. Kumar, and H. Yuen, Physical Review Letters 90, No. 22, 227901 (2003)). Two quadrature phase components of light (or a pair of intensity and phase) are never fixed simultaneously in the accuracy that is less than quantum mechanical fluctuation. In the event that the transmission basis is finely varied in an optical transmission and detection system using phase-shift keying and that adjacent transmission bases are included in a quantum fluctuation range, eavesdroppers who do not know the transmission basis are unable to take out meaningful information from the eavesdropped signals. In this system, the basis is uncertain within the quantum fluctuation. However, in the event that pseudo-random number which is used for regular cryptography is used in a process of varying the basis, it has been reported that the security is merely the level of regular classical cryptography when the number of photons per signal is large (Non-Patent Document 3: T. Nishioka, T. Hasegawa, H. Ishizuka, K. Imafuku, and H. Imai, Physics Letters A 327, 28-32 (2004)). Accordingly, the system is still in the research phase.

The method by Yuen et al. breaks away from utilization of the faint light with one or less photon and is invented by bearing in mind that not only keys are distributed but also signals themselves are transmitted, and it can be said that it is the invention which comes close to the realistic standpoint. However, this method is not premised on the macroscopic light intensity as used in general optical communication systems. A still more advanced invention is required to introduce a quantum-mechanical system into the general optical communication systems.

Because the quantum-mechanical properties generally become conspicuous in microscopic areas, when the light intensity is made macroscopic, the quantum-mechanical properties are generally difficult to be exhibited. As an optical state which indicates quantum-mechanical properties even at the macroscopic light intensity, a squeezed state is known. The squeezed state is a state that the fluctuation of a vacuum or a coherent state is controlled. Laser output light is well described by the coherent state (The fluctuation of a coherent state is equal to that of a vacuum). In a vacuum (a coherent state), the size of two quadrature fluctuation components is equal, whereas under the squeezed condition, one of the quadrature fluctuation components is smaller than a vacuum fluctuation and the other fluctuation component is larger than that. An area of vacuum fluctuation (fluctuation of the coherent state) in a quadrature phase space is the minimum that cannot be made smaller any more, and a noise level based on the vacuum fluctuation (also called quantum fluctuation) is called a standard quantum limit. The component of the reduced fluctuation in the squeezed state has broken the standard quantum limit and has been attracting researchers' attention. However, for example, when the squeezed state is under a loss process, the quadrature phase component whose fluctuation is small becomes easily the level of a vacuum fluctuation (fluctuation of a coherent state) due to an inflow of a vacuum fluctuation. Consequently, it is nearly impossible to apply the squeezed state to optical communications in which loss is unable to be avoided if the reduced fluctuation component is focused our attention on. On the other hand, with respect to the large fluctuation component in the squeezed state (antisqueezed component), the general properties of the fluctuation are determined by the originally expanded fluctuation even when a vacuum fluctuation is added due to loss. Even if there is any loss, although the fluctuation is reduced to the extent of the loss, it does not easily regress to the level of vacuum fluctuation (fluctuation of the coherent state). That is, the antisqueezed component has loss-tolerance nearly equal to the general classical optical communications. By similar discussion, also for an optical amplification, the component of the fluctuation reduced to a level equal to or less than that of the vacuum fluctuation is unable to maintain its properties, whereas the component of expanded fluctuation have loss-tolerance. The optical communication method which makes it difficult to be eavesdropped on by the use of the expanded fluctuation component is set forth in unpublished Patent Document 1 (Japanese Patent Laid-Open Publication No. 2006-191410).

According to the method of Patent Document 1, the signals are binary and the axes corresponding to the bases are randomly chosen in a phase space. The negative and positive directions of each base axis correspond to binary signals, and fluctuation is expanded in a direction perpendicular to the base axes. The random properties of the base axes are assumed to be able to be known by a legitimate receiver and, by using information on the bases, the legitimate receiver projects the signals in a direction of being not subjected to the expanded fluctuation and measures the projected signals (regular homodyne detection). On the premise that the legitimate receiver knows the random base axes, it never becomes difficult to receive the signals and because the signals are superimposed in the direction perpendicular to the expanded fluctuation, the S/N ratio of signals is never degraded. On the other hand, even if there is any eavesdropper, unless the eavesdropper has the information concerning the randomized bases, the eavesdropper detects signals including the expanded fluctuation and accordingly the S/N ratio is dramatically degraded. That is, because a bit error rate of the eavesdropper is significantly increased as compared to that of the legitimate receiver, security of communications is reinforced to such a degree.

In order that the sender and the receiver share information for the signal bases, a pseudo-random number generator using a seed key is used. The pseudo-random number generation using the seed key is the method generally adopted in the present cipher communications. The method using the antisqueezed light is a communication method with security reinforced by using the physical laws, wherein additional difficulty of eavesdropping is added to the security of regular cipher communications, based on the expanded fluctuation. Furthermore, in this method, if the antisqueezing strength is increased in accordance with the signal intensity, the similar bit error rate can be achieved, irrespective of the light intensity. Therefore the above method is the communication method which has quantum mechanical properties applicable even to the macroscopic number of photons as used in the regular optical communications.

Because the fluctuation of one quadrature phase component can be automatically expanded when squeezed light is generated, it is basically preferable to generate the squeezed light for generating antisqueezed light. Squeezed light-generating methods which have been invented thus far are primarily intended for squeezing, but are not intended to generate the antisqueezed light with macroscopic amplitude (intensity) for carrying out the secure optical communications. For example, a method using degenerate parametric down conversion has been a method in which $2\omega$-angular-frequency light is used as pump light to amplify $\omega$-angular-frequency light of no input signal (vacuum). The process depends on the phase and a vacuum is squeezed by approximately several dB (Non-Patent Document 4: L. Wu, M. Xiao, and H. J. Kimble, Journal of Optical Society of America 4, 1465-1475 (1987) and Non-Patent Document 5: T. Hirano and M. Matsuoka, Optics Letters 15, 1153-1155 (1990)). Various methods using Kerr effects of an optical fiber have been proposed. The Kerr effect is a phenomenon in which refractive index varies in accordance with light intensity. Refractive index is given by $n=n_0+n_2 I$, where I denotes light intensity. Herein, $n_0$ denotes linear refractive index and $n_2$ is the coefficient that gives the nonlinear refractive index. In the event that there is any fluctuation in a light amplitude direction (intensity), the refractive index is fluctuated by the Kerr effect and, as a result, the fluctuation is expanded in the phase direction. In the event that the expanded fluctuation in the phase direction is sufficiently small as compared to its amplitude, the fluctuation will be varied so that an area of fluctuation in the quadrature phase space is maintained. At this time, one direction of the fluctuation is reduced due to the expansion of the fluctuation in the phase direction. That is, the light is squeezed. A method intended to generate quasi-squeezed vacuum by using the principles as described above is a method of a symmetric type fiber interferometer (Non-Patent Document 6: M. Shirasaki and H. A. Haus, J. Opt. Soc. Am. B7, 30-34 (1990) and Non-Patent Document 7: C. X. Yu, H. A. Haus, and E. P. Ippen, Optics Letters 26, 669-671 (2001)), whereas a method intended to generate the light squeezed in the amplitude direction, having amplitude, is a nonsymmetrical type fiber interferometer (Non-Patent Document 8: M. J. Werner, Physical Review Letters 19, 4132-4135 (1998) and Non-Patent Document 9: S. Schmitt, J. Ficker, M. Wolff, F. Koenig, A. Sizmann, and G. Leuchs, Physical Review Letters 81, 2446-2449 (1998)).

These methods are primarily intended to generate the squeezed light and are not been intended to generate the antisqueezed light for the optical communications. Some methods may require solid-state laser or fiber laser as pump light or require even a high-stability optical interferometer. In addition, they do not always satisfy the requirements of long-term reliability, maintenance-free operation, a high-repetition rate, low jitter, and inter-pulse coherence, etc. which are required in the optical communications. Consequently, to achieve the secure optical communications as disclosed in Patent Document 1, any invention on the antisqueezed light source is essential.

SUMMARY OF THE INVENTION

The secure optical communications using the antisqueezed light is intended to improve communication security by maintaining the amplitude fluctuation of the signal light at the level of regular optical communications, expanding only the phase fluctuation, and increasing the bit error rate of eavesdroppers. Because the bit error rate of the eavesdroppers increases with the ratio $\Delta p/A_0$ of phase fluctuation $\Delta p$ to amplitude $A_0$, when the macroscopic light intensity (amplitude) of regular optical communications is used, the phase fluctuation will have to become a macroscopic size. Various methods which have been proposed and demonstrated in order to generate a squeezed state are ones for squeezing light by several dB with respect to vacuum fluctuation (consequently, antisqueezing it by several dB) and are not ones for obtaining macroscopic antisqueezing. Furthermore, conventional methods have used solid-state lasers or fiber lasers as pump light sources and also require an interferometer which requires high stability in some cases. For this reason, the conventional methods do not sufficiently comply with the requirements of the optical communications where maintenance-free operation and long-term reliability are essential. Consequently, the object of the present invention is to provide a method for generating the antisqueezed light that can provide sufficient $\Delta p/A_0$ by using only regular optical communication components with high reliability. Furthermore, another object of the present invention is to satisfy specifications such as a repetition rate, inter-pulse coherence, and low jitter which are required in the optical communications.

The Kerr effect of the optical fibers is used as a first principle to expand the fluctuation in the phase direction. Because this fluctuation-expanding effect increases with the light intensity, the required light intensity is inevitably increased. Because output light of a laser diode (LD) for optical communications is unable to obtain sufficient intensity even if it is amplified by an optical amplifier, the LD light is made into pulse forms by an intensity modulator and the peak intensity is reinforced by use of the high-order soliton compression effects of the optical fiber. If the pulse can be fiber-propagated while the reinforced peak power being maintained, the fluctuation in the phase direction can be increased by the Kerr effect. This can be achieved by introducing a second optical fiber and satisfying a fundamental soliton condition. Because optical fibers are long, sufficiently antisqueezed light in the phase direction can be obtained through an integration effect. The present means is configured only by components for optical communications and can satisfy specifications required for the optical communications.

The above-mentioned means is configured all only by components for regular optical communications and not only satisfy the requirements for the long-term reliability but also achieve the requirements for the maintenance-free operation. Furthermore, since the LD performs a continuous-wave (cw) operation, the inter-pulse coherence is also secured and since the repetition rate is determined only by a modulation rate of the intensity modulator, the repetition rate is variable and has low jitter with high stability. Therefore, the sufficiently antisqueezed light, which satisfies the specifications required in optical communications, can be obtained and the optical communications with security guaranteed from the viewpoint of the physical laws become feasible also at the level of macroscopic light intensity.

DESCRIPTION OF THE PREFERRED EMBODIMENTS

First Embodiment

Figure 1:
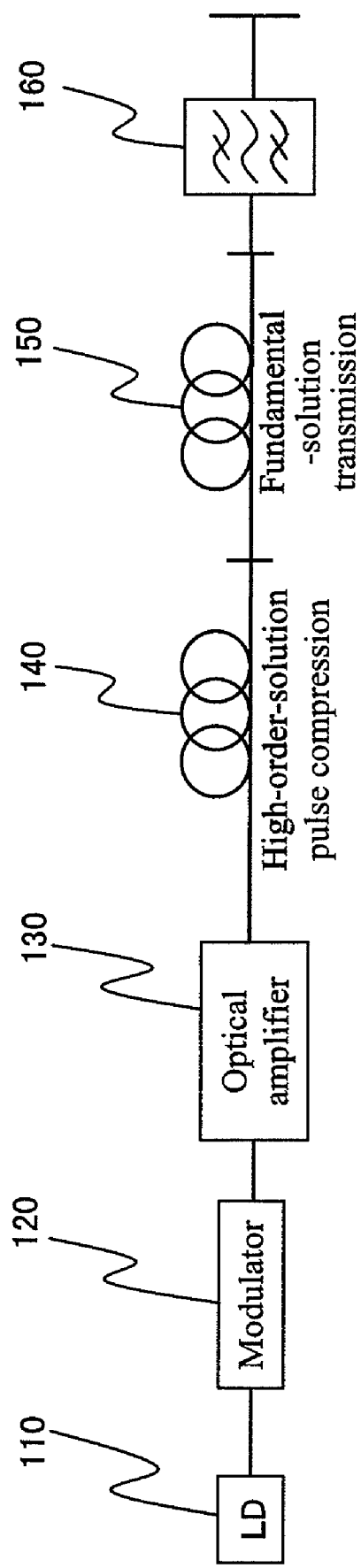
FIG. 1 is a view showing a configuration for specifically implementing the present invention.

FIG. 1 is a block diagram which shows one embodiment of the present invention. Output light from a cw LD 110 is converted into pulsed light by an intensity modulator 120, amplified by an optical amplifier 130, and transmitted to a single-mode fiber 140 which exhibits negative group-velocity dispersion at the operating wavelength of the LD 110. The pulsed light transmitted in the optical fiber is subject to a wavelength-dependent dispersion specific to the fiber and the light intensity-dependent Kerr effect. At an appropriate light intensity, the dispersion effect and the Kerr effect are balanced and the pulsed light is transmitted in the fiber with the pulse waveform being maintained. This is a state called the fundamental soliton. When the light intensity is increased from this soliton condition, a high-order soliton state is generated and a pulse width is varied in a period called the soliton period. If the transmission in the fiber 140 is terminated at a spot where the pulse width is shortened to a minimum, the pulsed light with a pulse width shorter than that at the input can be obtained. Because the peak power is increased by the pulse shortening, if the pulsed light is able to be transmitted in a single-mode fiber 150 with this waveform being maintained, the antisqueezed light with fluctuation expanded in the phase direction through the Kerr effect caused by high light intensity can be obtained. In addition, since the initial fluctuation is also amplified by the optical amplifier 130, antisqueezing is increased to the extent of such amplification. In order to transmit the pulsed light in the fiber 150 with the pulse waveform being maintained, it is required to satisfy the fundamental soliton condition and a fiber with a smaller negative group-velocity dispersion than that of the fiber 140 which satisfies the high-order soliton condition may be used. Because the pulsed light is transmitted in the fiber 150 with high peak power being maintained, the peak wavelength is shifted by the Raman effect and is separated from the light of the original operating wavelength of the LD 110 by a bandpass filter 160 located in the output stage of the fiber 150.

The foregoing is a basic principle of antisqueezed light generation. In order to obtain the optimum antisqueezed light, appropriate parameter setting is necessary. Hereinafter, basic matters necessary to determine the parameters will be first described.

1.1 Equations Describing Fiber Transmission of Pulsed Light

The light with a pulse width of approximately 1 ps or more, which is transmitted in an optical fiber, is expressed as follows by the use of so-called delay coordinates in which an origin on the time axis moves together with the pulse (Equation 1).

$$\left(\frac{\partial}{\partial z} + \frac{i}{2!}\beta_2\frac{\partial^2}{\partial T^2} - \frac{1}{3!}\beta_3\frac{\partial^3}{\partial T^3} + \ldots + \frac{1}{2}\alpha\right)A(z,T) =$$
$$i\gamma\left[\left(|A(z,T)|^2 - T_R\frac{\partial|A(z,T)|^2}{\partial T}\right)A(z,T) + \frac{2i}{\omega_0}\frac{\partial}{\partial T}(|A(z,T)|^2 A(z,T))\right].$$
(Equation 1)

(Agrawal, Nonlinear Fiber Optics, second edition, translated into Japanese, p. 51, Yoshioka Shoten, 1997). Because $A(z,T)$ describes an envelope which is left after extracting the carrier term from pulse amplitude and $|A|^2$ is normalized to express a light intensity. $\beta_i$ is the i-th order dispersion at the angular frequency $\omega_0$ of the carrier wave (Equation 2).

$$\beta_i \equiv \frac{\partial^i \beta}{\partial \omega^i}\bigg|_{\omega=\omega_0}.$$
(Equation 2)

Here $\alpha$ denotes an absorption coefficient and $T_R$ is the coefficient that expresses the first-order Raman effect which is approximately 5 fs in a silica fiber. $\gamma$ is the coefficient which gives a nonlinear effect defined by (Equation 3).

$$\gamma \equiv \frac{n_2\omega_0}{cA_{\mathit{eff}}}.$$
(Equation 3)

Here $n_2$ denotes nonlinear refractive index and $A_{\mathit{eff}}$ is the effective cross sectional of a fiber. The first term on the right-hand side of (Equation 1) gives the Kerr effect, the second term gives the Raman effect, and the third term gives the self-steepening effect of the pulse. It is impossible to solve analytically (Equation 1). However, the (Equation 1) can be numerically calculated, and a calculation's result will be shown later.

1.2 Quantum Soliton

In the delay coordinates, a reference point of time T moves together with the pulse, while in the analysis by (Equation 1), the amplitude on the T-axis is set as an initial condition and is evolved on the z-axis. Comparing with the regular feeling of equation of motion that describes the time evolution, roles of z and T are reversed. With the help of this sense, quantum soliton is conventionally described by interchanging notations of z and T. In the quantization procedure, classical field $A(z,T)$ in (Equation 1) is replaced by an operator as similar to the case of a regular electromagnetic field, and an appropriate commutation relation is assumed.

The soliton in an optical fiber is a state where self-phase modulation (first term on the right-hand side of (Equation 1)) and negative group-velocity dispersion (second term on the left-hand side of (Equation 1)) are balanced, and the soliton is able to be described by extracting only the main term of (Equation 1) (i.e., the first and second terms on the left-hand side and the first term on the right-hand side). By ignoring all other than the main terms because they are very small, we get the following equation, $$\frac{\partial}{\partial t}\hat{a}(t,x) = \frac{i}{2}C\frac{\partial^2}{\partial x^2}\hat{a}(t,x) + iK\hat{a}^\dagger(t,x)\hat{a}(t,x)\hat{a}(t,x).$$
(Equation 4)

Here (z,T) is rewritten to (t,x), and A is converted into $\hat{a}$, including the conversion of dimension, and a commutation relation $[\hat{a}(t,x), \hat{a}^\dagger(t,x')]=\delta(x-x')]$ is assumed. K is converted from $\gamma$ in dimension, and $C=-\beta_2$. (Equation 4) is Heisenberg equation in which an operator evolves in time, and from the visual similarity, is frequently called nonlinear Schrödinger equation. (Equation 4) has a well-known analytical solution for c-number and the quantum mechanical picture is frequently expressed as perturbation with respect to it (H. A. Haus and C. X. Yu, J. Opt. Soc. Am. B 17, pp. 618-628 (2000)).

$$\hat{a}(t,x) = a_0(t,x) + \Delta\hat{a}(t,x).$$
(Equation 5)

If the c-number part is extracted from the quantum operator, as shown in (Equation 5), the basic solution of the c-number part can be described by (Equation 6) and (Equation 7), wherein $A_0$, $p_0$, $\theta_0$, and $x_0$ are assumed as arbitrary constants.

$$a_0(t,x) = A_0 \exp\left[i\left(\frac{KA_0^2}{2}t - \frac{C}{2}p_0^2 t + p_0 x + \theta_0\right)\right]\mathrm{sech}\left(\frac{x - x_0 - Cp_0 t}{\xi}\right).$$
(Equation 6)

$$A_0^2 \xi^2 = C/K.$$
(Equation 7)

$\int|a_0|^2 dx$ gives an average photon number $n_0$. The quantum-mechanical picture can be discussed by the substitution of (Equation 5) into (Equation 4) and leaving up to the first order with respect to $\Delta\hat{a}$.

$$-i\frac{\partial}{\partial t}\Delta\hat{a} = \frac{C}{2}\frac{\partial^2}{\partial x^2}\Delta\hat{a} + 2K|a_0|^2\Delta\hat{a} + Ka_0^2\Delta\hat{a}^\dagger.$$
(Equation 8)

(Equation 8) suggests that the time evolution of quantum fluctuation caused by the Kerr effect is proportional to the intensity which is the c-number (the third and fourth terms on the right-hand side). When assuming $\Delta\hat{n}$, $\Delta\hat{\theta}$, $\Delta\hat{p}$, $\Delta\hat{x}$ as the q-number parts of $n_0$, $\theta_0$, $p_0$, and $x_0$, respectively, and solving (Equation 8), we get (Equation 9) and (Equation 10) using $\Phi(t)=KA_0^2 t/2$ and dimensionless parameters $\Delta\hat{A}_1=\Delta\hat{A}_0\sqrt{\xi}$, $\Delta\hat{A}_2=\hat{A}_0\Delta\hat{\theta}\sqrt{\xi}$ (H. A. Haus and C. X. Yu, J. Opt. Soc. Am. B 17, pp. 618-628 (2000)).

$$\Delta\hat{A}_1(t) = \Delta\hat{A}_1(0).$$
(Equation 9)

$$\Delta\hat{A}_2(t) = \Delta\hat{A}_2(0) + 2\Phi(t)\Delta\hat{A}_1(0).$$
(Equation 10)

Figure 2:
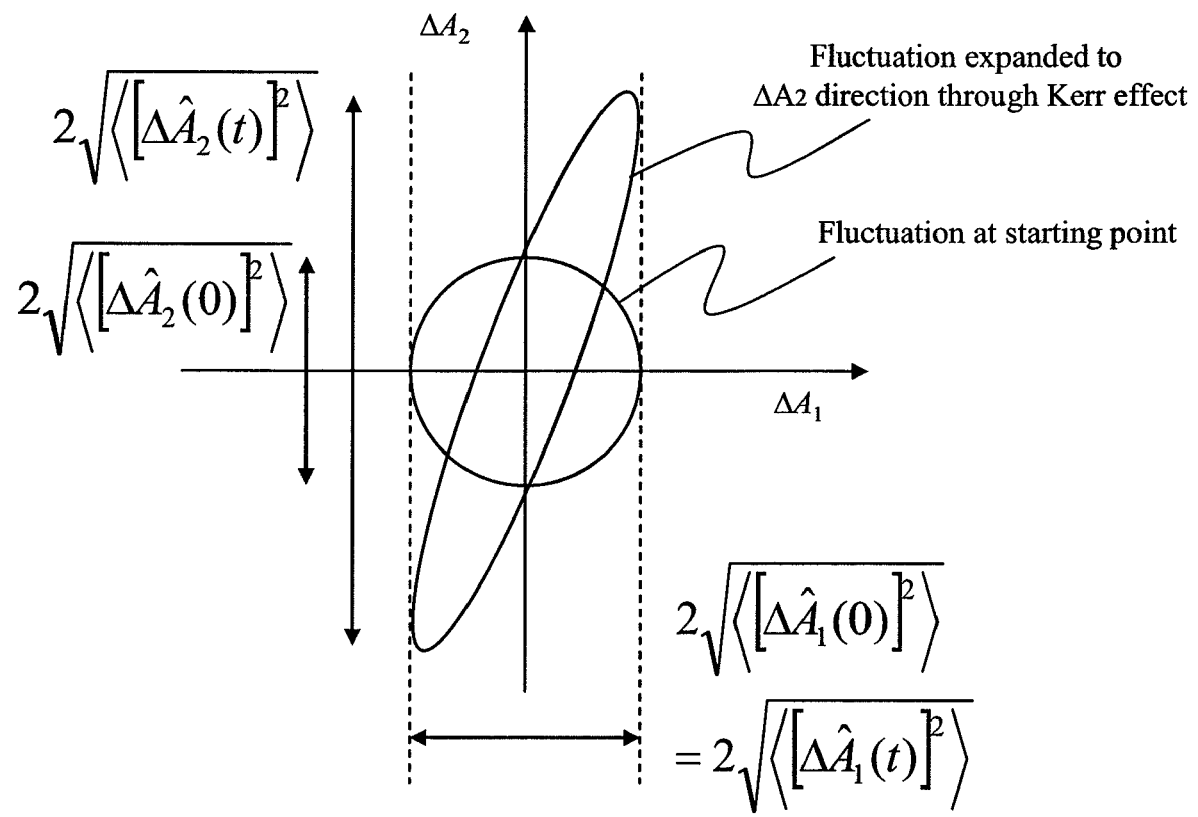
FIG. 2 a view showing how fluctuation in a quadrature phase space is varied through the Kerr effect.

The meaning of these equations is schematically shown in FIG. 2. Due to the Kerr effect, the fluctuation is expanded in the phase direction ($\Delta A_2$ direction), that is, antisqueezed. Because the $\Delta A_2$ fluctuation is expanded in proportion to the initial fluctuation of $\Delta A_1$, if the initial fluctuation is large, not the minimum fluctuation which is determined by the uncertainty relation, a greatly antisqueezed state can be generated. Parameter $\Phi$ gives squeezing parameter r by (Equation 11) (H. A. Haus and C. X. Yu, J. Opt. Soc. Am. B 17, pp. 618-628 (2000)).

$$\sinh r(t) = \Phi(t).$$
(Equation 11)

Here we roughly estimate squeezing strength. The nonlinear refractive index $n_2$ of an optical fiber is, for example, $2.66 \times 10^{20}$ m$^2$/W although reported values are dispersed. If an effective cross section $A_{eff}$ of an optical fiber is assumed to be 50 µm, then $\gamma = 2 \times 10^{-3}$ (Wm)$^{-1}$. If it is assumed that the pulse waveform is sech$^2$ as given by (Equation 6) and the peak power is 10 W and the optical fiber transmission length is 10 km, then $\Phi(t) = KA_0^2 t/2 = \gamma P_0 z/2 = 100$ ($P_0$ denotes peak power) and r=5.3. If squeezing (antisqueezing) is described by decibel units, then $10 \log e^{2r} = 46$ dB, and the antisqueezed component becomes 200 times (squeeze component: 1/200 times). If the initial fluctuation is set 10 to 100 times (corresponds to gain of $10^2$ to $10^4$) as much as a vacuum fluctuation by an optical amplifier (for example, EDFA: Erbium-doped fiber amplifier), the fluctuation of the antisqueezed component becomes 2000 to 20000 times as much as a vacuum fluctuation. If the photon number per one signal is assumed to be $10^6$ (equivalent to 0.3 mW in the 1.55-µm wavelength at a rate of 2.5 Gbps), the angle θ which is subtended by this expanded fluctuation at the origin in the phase space (for example, in the event that the antisqueezed fluctuation are 2000 times as much as the vacuum fluctuation) is 90°. It becomes 35° when the photon number is $10^7$.

When $\Delta A_2$ becomes large in this way, the approximated equation (Equation 8) does not describe the phenomenon correctly and the accuracy of estimate is lost. However, we can understand that antisqueezing is sufficiently large. Although FIG. 2 expresses inclined quadrature squeezing (antisqueezing), when the angle which is subtended by the antisqueezed fluctuation at the origin in the phase space increases, this expression of FIG. 2 is no longer accurate and a shape of fluctuation becomes crescent-shaped.

1.3 Soliton Order

As described in Section 1.2, if the optical pulse is transmitted in the fiber at the light intensity at which the Kerr effect works sufficiently, antisqueezing is proportional to the product of the light intensity and the fiber length. Since the fiber has a loss (−0.2 dB/km), the fiber length at which the Kerr effect works effectively is limited in order of 10 km. In order to obtain the antisqueezing estimated in the preceding section, peak power of approximately 10 W is required. The output light of the LD is approximately 10 mW and even when it is amplified by an optical amplifier, the output power is approximately 1 W. Therefore, the peak intensity must be increased by some methods such as pulse compression etc. On pulse compression methods using optical fibers, a high-order soliton compression and an adiabatic compression of fundamental soliton in dispersion-decreasing fibers have been known. The former is suited for compressing a pulse of approximately 10 to 100 ps to that of approximately 1 ps and the latter is suited for compressing a pulse of approximately 1 ps to that of approximately 0.1 ps. Even in either method, the important parameter which serves as a reference is the soliton order N which is given by (Equation 12) with $T_0$ being set as a pulse width (equal to ξ in (Equation 6)).

$$N^2 = \gamma P_0 T_0^2 / |\beta_2|. \quad \text{(Equation 12)}$$

For the intensity modulator 120 which converts cw light to pulsed light, it is advantageous to utilize an electro-absorption (EA) modulator in which extinction characteristics are nonlinear with respect to applied voltage. IF the LD output light is sinusoidally modulated to the maximum by the EA modulator (the maximum means that voltage is applied in the range in which the modulator are not destroyed), then $T_0$ becomes approximately 50 ps at 2.5 GHz. If parameters of a standard-dispersion fiber ($\gamma = 1.3 \times 10^{-3}$ (Wm)$^{-1}$ and $\beta_2 = -2.0 \times 10^{-2}$ ps$^2$/m) are used, then N=12.7 for $P_0 = 1$ W. This is a high-order soliton.

Although the fundamental soliton is transmitted with the pulse waveform being maintained, the high-order soliton is transmitted with the pulse width beating at the soliton period given by $z_0 = (\pi/2) T_0^2 / |\beta_2|$. Fiber transmission is ended when the pulse width becomes shortest. As shown in the numerical calculation later, by the use of regular components for optical communications, a pulse width of approximately 1 ps and a peak power of several tens W can be obtained. If this pulse is able to be transmitted in the optical fiber 150 in order of 10 km length with such waveform being maintained, the sufficient antisqueezing can be obtained, based on the discussion in the preceding section. It means that the fundamental soliton condition of N=1 must be satisfied during the transmission of 10 km. Fortunately, fibers called non-zero dispersion-shifted fibers (NZDSF) have been developed, so that a condition of satisfying N=1 of (Equation 12) can be achieved.

1.4 Methods for Estimating Antisqueezing

As described in Section 1.2, the antisqueezed fluctuation can be estimated by the following (Equation 13) obtained from (Equation 10) when the squeezing strength $\Phi$ is sufficiently large (where t means z in this case), $$\Delta A_2 = \sqrt{\langle [\Delta \hat{A}_2(t)]^2 \rangle} \quad \text{(Equation 13)}$$

$$\cong 2\Phi(t) \sqrt{\langle [\Delta \hat{A}_1(0)]^2 \rangle}$$

$$= \gamma P_0 z k_0 / 2,$$

$$k_0 \equiv 2\sqrt{\langle [\Delta \hat{A}_1(0)]^2 \rangle}, \quad \text{(Equation 14)}$$

Here $k_0$ denotes initial fluctuation in $\Delta A_1$ direction, and is assumed to have been amplified and is set to be $k_0 \gg 1$. Since γ and $P_0$ are functions of z, (Equation 13) should be integrally represented. As clear from FIG. 2, expansion of fluctuation in $\Delta A_2$ direction is proportional to $k_0$, where $k_0$ is a constant. The fluctuation in the $\Delta A_1$ direction at each position z is modified in accordance with optical fiber loss. In addition, the antisqueezed fluctuation is also reduced due to the loss of the fiber transmission. If a condition $k_0 \gg 1$ is assumed and therefore the effect on an inflow of a vacuum fluctuation associated with the loss is ignored, then the following (Equation 15) is obtained by incorporating the above-mentioned facts.

$$\Delta A_2 = \int_0^L \gamma(z) P_0(z) k_0 \exp\left(-\int_0^z \alpha(z_1) dz_1 / 2\right) \exp \quad \text{(Equation 15)}$$

$$\left(-\int_z^L \alpha(z_2) dz_2 / 2\right) dz$$

$$= \int_0^L \gamma(z) P_0(z) k_0 \exp\left(-\int_0^L \alpha(z_1) dz_1 / 2\right) dz.$$

The first exponential factor on the right-hand side on the first line indicates attenuation of fluctuation in the $\Delta A_1$ direction and the second exponential factor indicates attenuation of fluctuation in the $\Delta A_2$ direction. Because γ and α can be determined by the optical fiber used, the quantity required in finding $\Delta A_2$ is $P_0$ only, which is c-number. Consequently, the problem is equivalent to numerically solving (Equation 1) using the actual optical fiber conditions.

In the evaluation of the antisqueezing by (Equation 10), only the Kerr effect (first term on the right-hand side of (Equation 1)) is taken into account as a nonlinear term. As shown by the following simulation, the Raman term (second term on the right-hand side of (Equation 1)) in the pulse transmission exhibits a large effect, too. Therefore, we estimate effects of the second and third terms on the right-hand side of (Equation 1) by comparing with the first term. A difference between the second term on the right-hand side of (Equation 1) and the first term is that the second term has an operator of $-T_R(\partial/\partial T)$. If the second term of (Equation 1) is left in (Equation 8), the same difference will be found in (Equation 8) in which the c-number part is separated and the q-number part is linearly approximated. When 1 ps pulse is considered, the factor arising from $(\partial/\partial T)$ is approximately 1 ps$^{-1}$, and if $T_R=5$ fs, the factor generating from $T_R(\partial/\partial T)$ becomes approximately 1/200. Consequently, the Raman term can be ignored in the estimate of antisqueezing. Similarly, the factor of the third term on the right-hand side of (Equation 1) is $(2i/\omega_0)(\partial/\partial T)$. If a 1-ps pulse at 1550-nm wavelength is considered, the factor of the effect is approximately 1/600 of the first term of (Equation 1). Based on the foregoing estimate, it is clear that the antisqueezing can be generally estimated by (Equation 15).

1.5 Characteristics of EA Modulator

For the intensity modulator 120, it is advantageous to use an electro-absorption (EA) modulator whose extinction characteristics are nonlinear with respect to applied voltage. The extinction characteristics and the chirp characteristics of EA modulators are complicated and there are individual differences. However, they could be generally expressed by the following approximation. When V is applied voltage and $\delta V$ is a fitting parameter, transmittance T can be comparatively satisfactorily expressed by the term sech$^2(V/\delta V)$ up to approximately $-15$ dB. In the simulation shown in the present embodiment, $\delta V=1/1.8$ V is assumed. The chirp characteristics are frequently expressed by $\alpha$-parameter, which is the ratio of the real part of refractive index to the imaginary part, $\alpha=\delta n'/\delta n''$. In the present simulation, the voltage characteristics of the $\alpha$-parameter are linearly approximated ($\alpha=B-CV$), and $B=1.2$ and $C=2.3$ V$^{-1}$ are assumed for the EA modulator of a 10-GHz and 1600-ps/nm type, and $B=1.6$ and $C=1.4$ V$^{-1}$ for the EA modulator of an 800-ps/nm type.

When the effective length of an EA modulator is assumed to be $z_0$, its transmittance can be given as $T=\exp(-2\delta n'' k_0 z_0)$ =sech$^2(V/\delta V)$ and the phase change associated with extinction of the EA modulator can be expressed by (Equation 16).

$$\phi(t)=\delta n' k_0 z_0 = (B-CV)\cdot ln[\cos h(V/\delta V)]. \quad \text{(Equation 16)}$$

1.6 Numerical Calculation Method for Propagation Equation

The propagation equation of optical pulse (Equation 1) can be calculated by a method called the split-step Fourier method Agrawal, Nonlinear Fiber Optics, second edition, translated into Japanese, pp. 56-60, Yoshioka Shoten, 1997). This method calculates linear terms in the Fourier domain and nonlinear terms directly in the time domain, and the linear and nonlinear terms are separately alternately calculated. In the simulation shown in the present embodiment, a discrete fast Fourier transform composed with 4096 points is used, and the period on the time axis is set to 400 ps by assuming that the EA modulator is sinusoidally modulated at 2.5 GHz. Because the period of the discrete Fourier transform is set to coincide with the modulation period, even when the pulse reaches a boundary through transmission, the pulse starts over again from the opposite boundary. Accordingly, any troubles do not occur at the boundaries.

The above-mentioned matters are the basic theory for optimally determining the parameters of the configured component in the first embodiment. In the following, an example of parameters, which were optimized actually in accordance with the above-mentioned theory, will be described.

1.7 High-Order Soliton Compression and Method for Determining Fiber Length 140

Figure 3A:
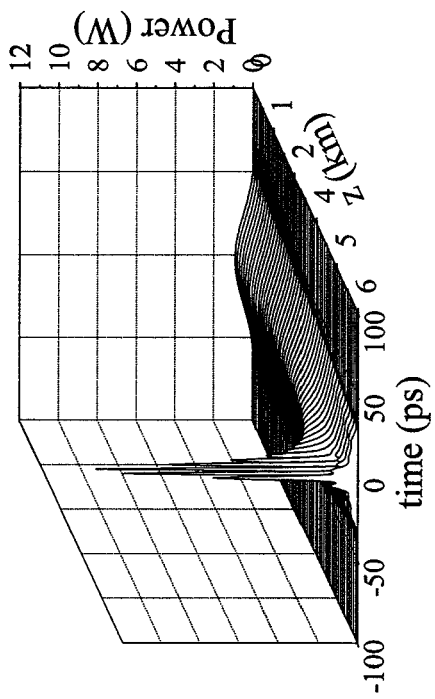
FIG. 3A is a view showing a pulse waveform and phase when output light from a cw LD is sinusoidally modulated by an EA modulator at 2.5 GHz, wherein the phase is chosen in a range of (−π/2, π/2)

In the configuration of FIG. 1, an EA modulator is assumed to be adopted for the intensity modulator 120, wherein light is modulated by a 2.5-GHz sinusoidal wave. Because of nonlinearity of the EA modulator with respect to applied voltage, even the sinusoidal modulation gives a sech$^2$-shape pulse as shown in FIG. 3A. In FIGS. 3A to 3D, each solid line indicates intensity $|A|^2$ and each broken line indicates a phase of the amplitude A. The phase is a periodic function of $2\pi$ and is chosen in a range of $(-\pi/2, \pi/2)$ in FIG. 3. The extinction characteristics of the EA modulator can be approximated by the Sech$^2$ function with respect to the applied voltage as described in Section 1.5. This function can be approximated to an exponential function when an offset voltage is applied (the applied voltage to the EA modulator is negative and it is set at $-0.5$ V). In order to make pulses as short as possible, the maximum voltage which is allowed in the specifications is applied, and the peak-to-peak modulation amplitude is set at 4.5 Vpp. FIG. 3A shows the output pulse from the intensity modulator 120 when the chirp characteristics are assumed to be a 1600-ps/nm type ($B=1.2$ and $C=2.3$V$^{-1}$). The pulse width is 60 ps (full width at half maximum: FWHM), and $T_0$ is 34 ps when sech$^2$ waveform is assumed. The duty ratio of this pulse is approximately 1/6. Considering this duty ratio, we set the peak output power from the optical amplifier 130 is set at 1 W. In this case, the average light intensity is 22 dBm, and the condition of 27 dBm or lower, which is one of the criteria of safety in optical communications, is satisfied.

Figure 3B:
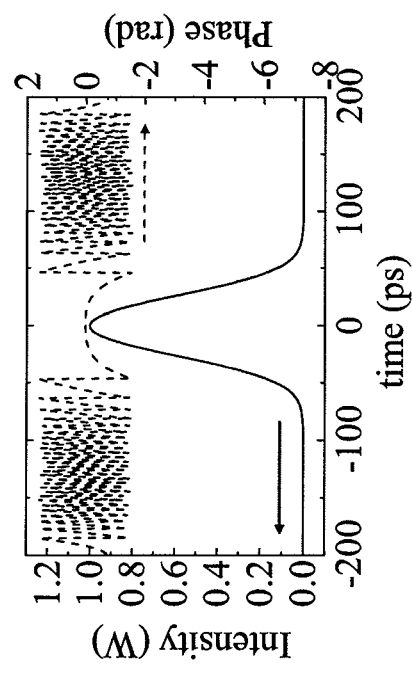
FIG. 3B is a view showing how the pulsed light of FIG. 3A is propagated in a standard-dispersion fiber.
Figure 3D:
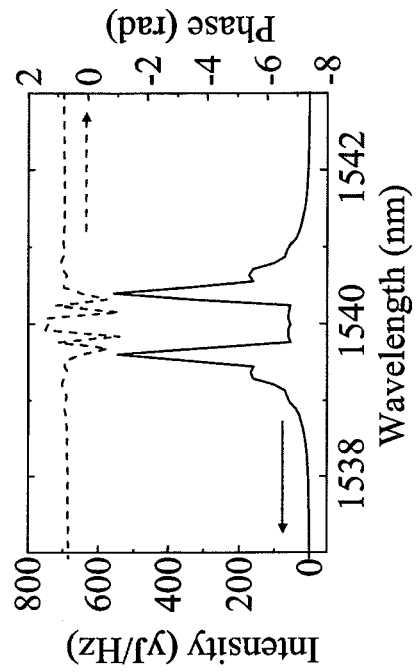
FIG. 3D is a view showing the spectrum and phase of the pulse of FIG. 3C in the spectral domain.
Figure 3C:
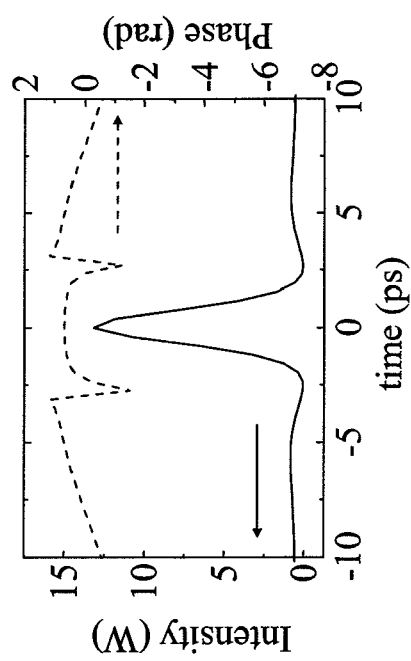
FIG. 3C is a view showing the pulse waveform and phase represented at a position of z=5640 m in FIG. 3B.

FIG. 3B shows a result when the optical pulse of FIG. 3A is transmitted by 6 km in a single mode fiber with standard dispersion. The parameters of the standard-dispersion fiber are assumed to be $\beta_2=-2.0\times 10^{-2}$ ps$^2$/m, $\beta_3=1.2\times 10^{-4}$ ps$^3$/m, $\gamma=1.3\times 10^{-3}$ (Wm)$^{-1}$, $\alpha=0.2$ dB/km, and $T_R=5$ fs at a wavelength of 1540 nm. As shown in FIG. 3B, the pulse suddenly begins to narrow approximately at a position of 5 km, and the pulse indicates the maximum peak power (13 W) at 5640 m when the step is 120 m. FIG. 3C shows the pulse waveform in that position. Although wide shoulders exist, its center portion is compressed to a pulse width of 1.7 ps (FWHM) (assuming sech$^2$ (t/T$_0$), then $T_0=0.95$ ps). FIG. 3D shows the spectra in that case. Structured spectrum and phase reflect a high-order soliton. (The step on the time and wavelength axes in the drawings is set 4 times as much as that of the calculation point). By the foregoing simulation, the optimum fiber length of 5640 m was obtained. However, this length can be roughly estimated by the use of the following empirical formula (Equation 17) (Agrawal, Nonlinear Fiber Optics, second edition, translated into Japanese, p. 249, Yoshioka Shoten, 1997).

$$z_{opt} = z_0\left(\frac{0.32}{N} + \frac{1.1}{N^2}\right), \quad \text{(Equation 17)}$$

$$z_0 = \frac{\pi}{2}\frac{T_0^2}{|\beta_2|}. \quad \text{(Equation 18)}$$

Here N denotes the soliton order in the fiber 140 obtained from (Equation 12) and, $z_{opt}$ is estimated at 4680 m when $T_0=34$ ps and $\beta_2=-2.0\times10^{-2}$ ps$^2$/m. Its value roughly coincides with the simulated result of 5640 m with a 20% error.

In the foregoing simulation, a 1600-ps/nm type has been assumed for the chirp characteristics of the EA modulator. Even if the chirp characteristics of the EA modulator are an 800-ps/nm type, the similar simulation is possible. In this case, the fiber length at which the maximum peak power is obtained is 5880 m (in a simulation of a 120-m step) and is slightly longer than that obtained for the 1600-ps/nm type (maximum peak power is conversely several tens % lower than that obtained for the 1600-ps/nm type). Thus, the optimum fiber length slightly varies with the chirp characteristics of the EA modulator 130 or the parameters of fiber 140.

In a process where an antisqueezed light source is actually assembled, the length of fiber 140 is determined using the accurate simulations or the empirical formula (Equation 17), or any empirical formula obtained from both. Next, the intensity of the output light from the optical amplifier 130 is varied, and the pulse width of the output light from the fiber 140 is measured. When the shortest pulse width is obtained, the antisqueezed light source is optimized and may be adopted as a complete product.

We have shown an example so far, in which a standard-dispersion fiber is used as the fiber 140. The high-order soliton compression effects are effective when the soliton order N is greater than 1. This condition is satisfied for other kinds of fibers than the standard-dispersion fiber if the fibers exhibit the negative group-velocity dispersion at the wavelength to be used. In addition, solutions are found in a combination of such fibers.

Figure 4A:
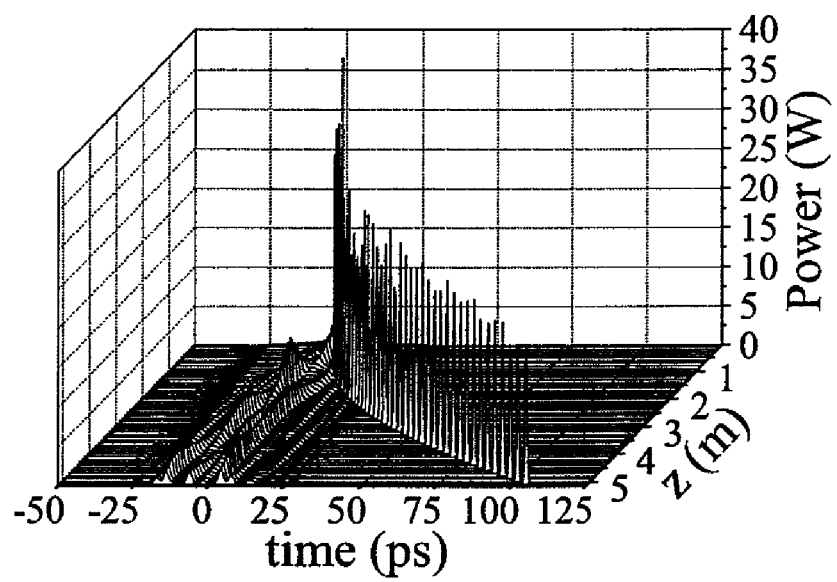
FIG. 4A is a view showing how a high-order soliton-compressed pulse transmits a nonzero dispersion-shifted fiber (NZDSF), wherein a Raman soliton is formed from the high-order soliton and is separated on the time axis.

1.8 Fundamental Soliton Transmission in Fiber 150 and Length Determining Method Antisqueezed light can be obtained when pulsed light is compressed through the fiber 140 and transmitted in the fiber 150 with the high peak power being maintained. This requirement can be achieved using a non-zero dispersion-shifted fiber (NZDSF) for the fiber 150. FIG. 4A shows a result when a high-order soliton-compressed pulse (FIGS. 3C and 3D) is successively transmitted in the NZDSF of 5 km ($\beta_2=-4.8\times10^{-3}$ ps$^2$/m, $\beta_3=1.0\times10^{-4}$ ps$^3$/m, $\gamma=2.0\times10^{-3}$ (Wm)$^{-1}$, $\alpha=0.2$ dB/km, and $T_R=5$ fs at a wavelength of 1540 nm). After the high-order soliton compression, because the peak power and its derivative with respect to time are large, the second term on the right-hand side of (Equation 1) which expresses the Raman effect plays an important role.

Figure 4B:
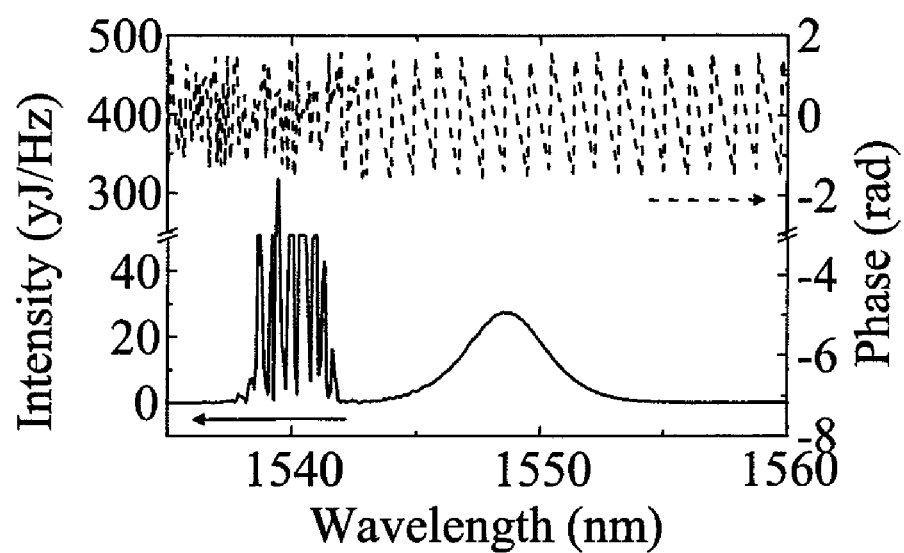
FIG. 4B is a view showing spectra after the pulse is transmitted in the NZDSF of 5 km, wherein the original high-order soliton and the Raman soliton are separated in the spectrum.

The second term on the right-hand side of (Equation 1) is originated from that an atomic nucleus in a crystal responds to light with delay. Quantum-theoretically, the high-order soliton-compressed pulse becomes pump light and amplifies light at a one-phonon lower energy side (Stimulated Raman Scattering), and the fundamental soliton that satisfies N=1 of (Equation 12) is spontaneously formed (Raman Soliton). Because the Raman soliton becomes pump light by itself and causes the intra-pulse stimulated Raman scattering, it spontaneously shifts the peak wavelength to a longer wavelength side (FIG. 4B). Because of this long-wavelength shift, the Raman soliton is separated from the pump light on the time axis through the dispersion of NZDSF (FIG. 4A). The pulse width and the peak power are determined in such a manner as to satisfy (Equation 12), depending on conditions on the pump light. Unless N≧1 is satisfied, the pump light is unable to form a soliton and therefore the pump light must satisfy a necessary given condition. When adopting the values ($P_0=13$ W and $T_0=0.95$ ps) of the pump light (high-order soliton-compressed pulse), (Equation 12) gives N=2.2. Since all the pump light is not converted to a Raman soliton, N must be sufficiently greater than 1. Under the condition shown in FIG. 4, the Raman soliton is formed without any trouble, and the peak power of the Raman soliton exceeds that of the pump light. The Raman soliton spontaneously adjusts the peak power, pulse width, and spectral width to satisfy the soliton condition even if there is any perturbation such as loss in the fiber, thereby being transmitted over a long distance while both pulse waveform and spectrum are maintained with appropriate characteristics. Because the spectra of the Raman soliton separate from the pump light, as seen in FIG. 4B, high-purity antisqueezed light can be obtained if the pump light is removed by the band-pass filter 160. Connection loss between the NZDSF and the standard-dispersion fiber is assumed to be −0.2 dB in the simulated results of FIGS. 4A and 4B. The results are scarcely influenced by the slight variation of the loss.

Figure 5A:
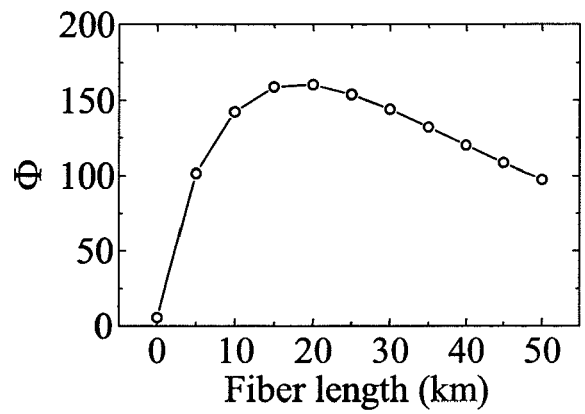
FIG. 5A is a view showing plots of antisqueezing strength which increases/decreases as a Raman soliton transmits the NZDSF.
Figure 5B:
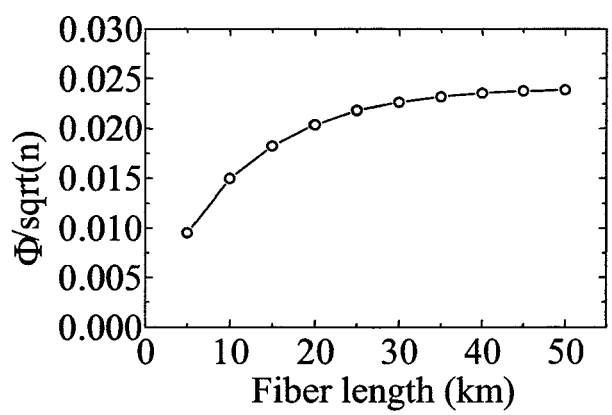
FIG. 5B is a view showing plots where an index of an angle which is subtended by the antisqueezed fluctuation at the origin in a quadrature phase space is denoted with respect to the NZDSF transmission length.

The antisqueezing strength is able to be estimated from (Equation 15). If the peak power can be maintained large, the antisqueezing increases with the transmission length, whereas the loss increases with the fiber length. Therefore, there is a fiber length which maximizes the antisqueezing. FIG. 5A shows a plot of antisqueezing strength Φ (degree of amplification) with respect to fiber length 150. When the target antisqueezing strength (degree of amplification) is decided, fiber length 150 is determined in accordance with FIG. 5A. In case of Patent Document 1, the important quantity is not the absolute strength of the antisqueezing itself but the angle θ which is subtended by the antisqueezed fluctuation at the origin in the phase space. θ is determined by the expression $\tan\theta=k_0\Delta A_2/\sqrt{n_0}$. FIG. 5B shows a plot of $\Phi(z)/\sqrt{n_0}\approx\Delta A_2/\sqrt{n_0}$ with respect to the transmission length of the fiber. The average photon number $n_0$ is estimated from the integrated power in the spectrum, which composes Raman soliton, divided by the photon energy at $\lambda=1540$ nm. When pump light is amplified 1000 times by an optical amplifier, then $k_0\approx10\sqrt{10}$. When $\Phi(z)/\sqrt{n_0}=0.024$, then $2\theta=74°$ is obtained, which is sufficient. When the target angle θ is decided, $\Phi(z)/\sqrt{n_0}$ is determined from θ and the degree of amplification (that is $k_0$) of the optical amplifier and the fiber length 150 is determined from FIG. 5B. As seen in FIG. 5B, since $\Phi(z)/\sqrt{n_0}$ is saturated with the fiber length, a meaningful fiber length 150 may be approximately 50 km. However, there are cases in which the fiber 150 is further made longer in order to satisfy a requirement for making small the output power from the antisqueezed light generator or reducing the spectral width. In this case, the fiber length may be set to approximately 100 km.

Figure 5C:
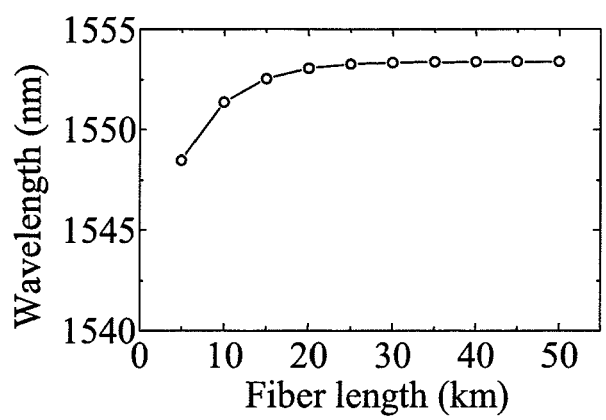
FIG. 5C is a view showing plots where the peak wavelength of the Raman soliton is denoted with respect to the NZDSF transmission length.

FIG. 5C shows a plot of peak wavelength of Raman soliton. The peak-shift is saturated earlier than $\Phi(z)/\sqrt{n_0}$. Because the peak-wavelength shift of Raman soliton is able to be estimated from this figure, the operating wavelength of the LD 110 is adjusted to obtain the desired wavelength of the antisqueezed light (in the present embodiment, the LD 110 operates at 1540 nm).

Because the pump light (output light of the LD 110) and the antisqueezed light (Raman soliton) differ in wavelength as shown in FIG. 4B, it is possible to take out only the antisqueezed light by a band-pass filter 160. The Raman soliton satisfies the fundamental-soliton condition, and both time waveform and spectra are smooth with good quality including the phase. Because the antisqueezed light and the pump light are desired to be spectrally separated, the fiber length 150 should be long enough so as to make the separation possible. As shown in FIG. 4B, a fiber length of 5 km is sufficient for the peak separation in case of the parameters used in the present embodiment. Even for the still shorter fiber length, their separation is possible and a fiber length of 1 km or 2 km will be its approximate lower limit.

NZDSFs are commercially available with various specifications and can be generally classified into a low-dispersion type and a medium-dispersion type. In the present embodiment, the low-dispersion type has been assumed. When the medium-dispersion type is used, the antisqueezed light intensity and the Raman shift become small. When those quantities are desired to be suppressed, for example, due to the high output power from the optical amplifier 130, the medium-dispersion type is advantageous to be used. We could select a suited fiber in accordance with various objects.

Second Embodiment

Figure 6:
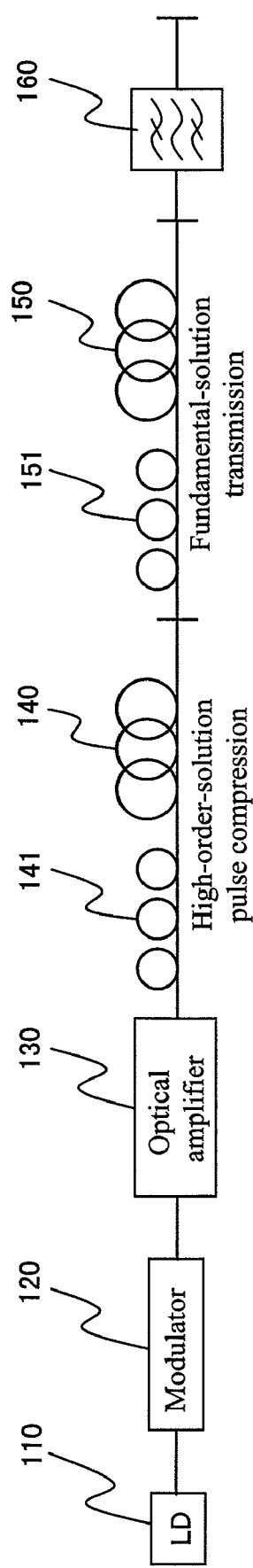
FIG. 6 is a view showing a configuration which permits fine adjustment of a system by adding a polarization controller to a configuration illustrated in FIG. 1.

Single mode fibers are basically formed circularly symmetric, but has slight birefringence caused by strain, twist, or bend. Because of this birefringence, the polarization of the transmitted light is varied, whereby the effective Kerr effect is slightly changed. If a polarization controller 141 is installed ahead of the input of the fiber 140 as shown in FIG. 6, it is possible to control the effective Kerr effect and to obtain the optimum condition for high-order soliton compression. Similarly, if a polarization controller 151 is installed ahead of the input of the fiber 150, it is possible to control the effective Kerr effect in the fiber 150 and to get the optimum condition in generating the antisqueezed light.

Third Embodiment

Figure 7:
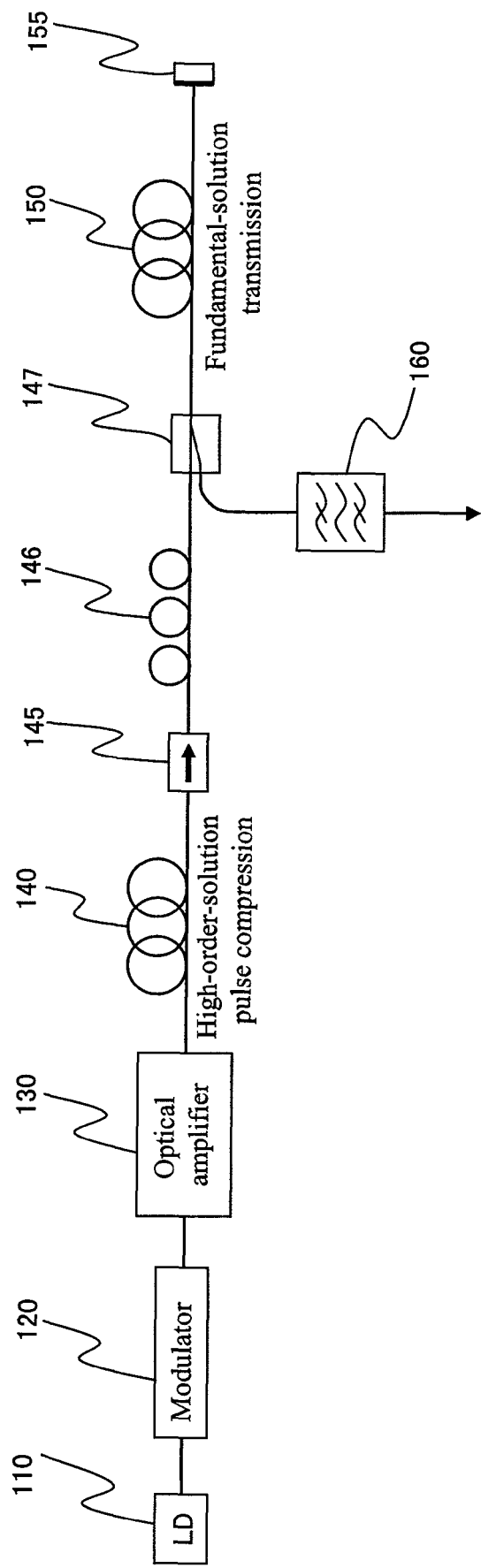
FIG. 7 is a view showing a configuration in which a fiber 150 for growing fluctuation is used for a round-trip light path as one of means for specifically implementing the present invention.

In the first and second embodiments, one-directional configurations are adopted and they are advantageous from a viewpoint of their simple configuration. However, for the fiber 150, the length of 10 to several tens km is typically required, which is rather uneconomical. FIG. 7 shows a round-trip transmission configuration for the fiber 150. The configuration up to the fiber 140 is the same as that of the first Embodiment. After the fiber 140, the light first passes an isolator 145. This is needed because slight returned light is present in the round-trip configuration. Next, the light is controlled to linearly polarized light by a polarization controller 146 and passes a polarizing beam splitter 147. If the transmission line from the LD 110 to the polarizing beam splitter 147 is connected with polarization-maintaining fibers, the polarization controller 146 can be omitted. After passing the polarizing beam splitter 147, the light is transmitted in the fiber 150, is converted into orthogonal polarization at a Faraday mirror 155, travels reversely in the fiber 150, and returns to the polarizing beam splitter 147. Because the polarization is orthogonal between a forward and backward transmission, the light does not return to the originally transmitted port at the polarizing beam splitter 147 and is outputted toward the band-pass filter 160 side. A Raman soliton (antisqueezed light) only is extracted through the filter 160.

The basic operation of the present embodiment is the same as that of the first embodiment and methods of design and simulation are the same as those of the first embodiment if considering loss and etc. of newly added components. In addition, as similar to the second embodiment, the polarization controllers 141 and/or 151 may be installed to optimize the system. In the present embodiment, the fiber 150 performs the round-trip transmission and the polarization is orthogonal between the forward and backward transmission, in principle. However, due to polarization mode dispersion and the incompleteness of the Faraday mirror, the orthogonality is not always perfect when the light returns to the polarizing beam splitter 147. Because the polarization mode dispersion can be somewhat adjusted if the polarization controller 151 is installed, the incompleteness of this orthogonality may be partly eliminated.

Fourth Embodiment

Figure 8:
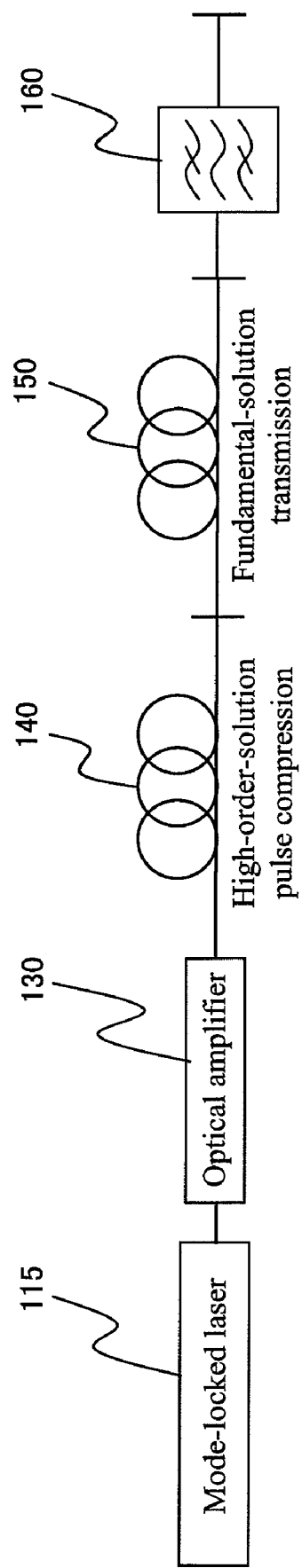
FIG. 8 is view showing one configuration for specifically implementing the present invention.

In the first, second, and third embodiments, optical pulses have been generated using a cw LD 110 and an intensity modulator 120. When a mode-locked laser 115 is used as a light source of seed light as shown in FIG. 8, the output light itself is optical pulses and accordingly the intensity modulator 120 may be omitted. In addition, if the pulse width is sufficiently narrow, the high-order soliton compression is not needed (that is, the fiber 140 is not needed) and the direct input of amplified light by the optical amplifier 130 to the fiber 150 produces antisqueezed light.

FIG. 8 shows a modified configuration of FIG. 1 in which the light source is replaced with a mode-lock laser. The same modification is possible in FIGS. 6 and 7, where the LD 110 and the intensity modulator 120 are replaced with the mode-lock laser 115, and the desired operation is performed.

Fifth Embodiment

Figure 9:
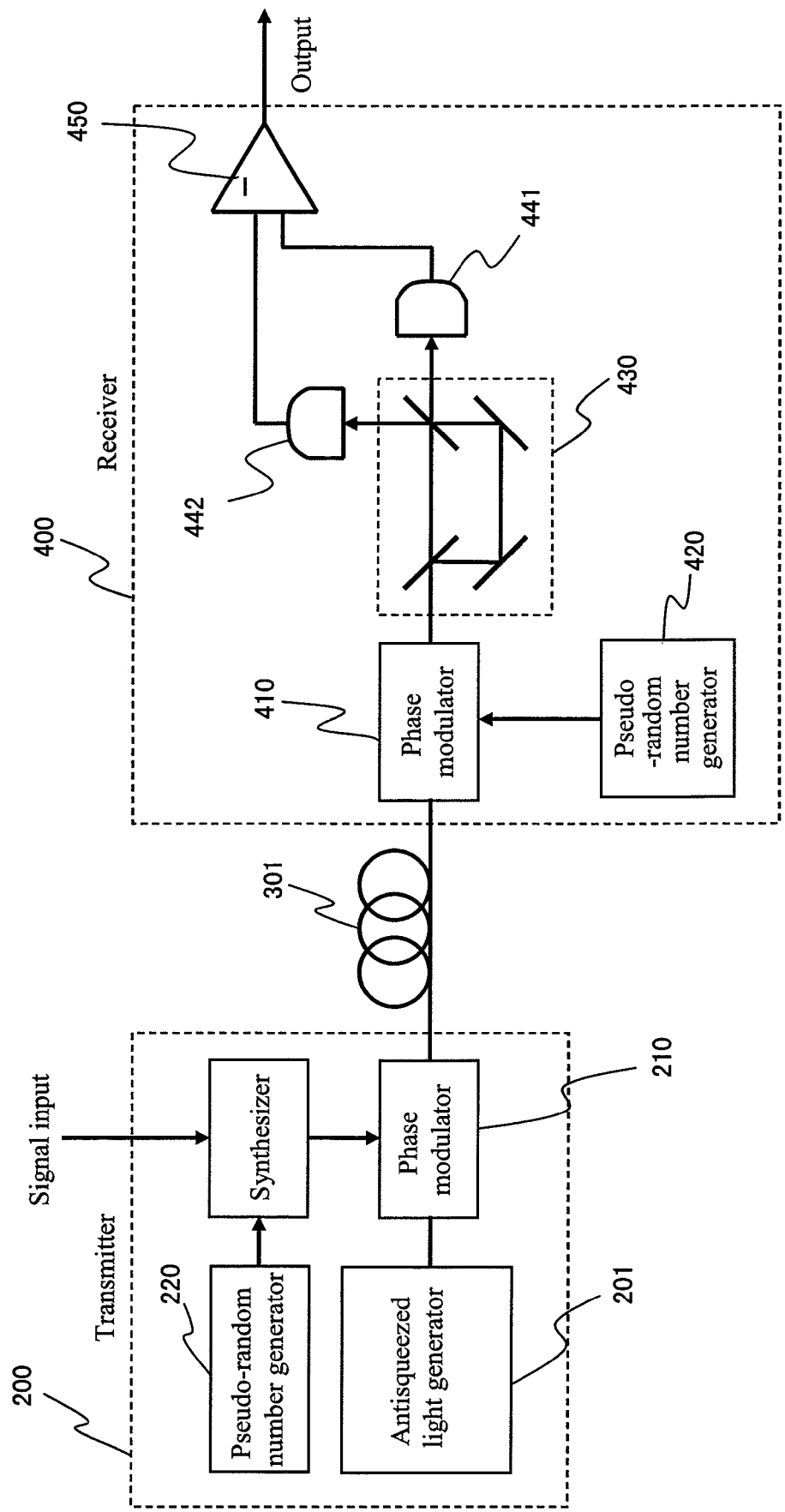
FIG. 9 is a block diagram showing one configuration for specifically implementing secure optical communications using a antisqueezed light generator achieved by the present invention.

FIG. 9 shows one example of an optical communication system using an antisqueezed light generator 201 obtained in the first to fourth embodiments. The example shown herein is the case of differential-phase-shift keying (DPSK). The antisqueezed light is modulated at a phase modulator 210, corresponding to signals, and is sent. At the phase modulator, a randomized phase $\alpha$ ($0 \leq \alpha \leq 2\pi$), which utilizes outputs from a pseudo-random number generator 220, is superimposed in addition to the signal phase $(0,\pi)$ which corresponds to the binary signal of $(0,1)$. When the signal phase is $\Phi$ ($\Phi=0$ or $\pi$), the phase superimposed at the phase modulator is $\Phi+\alpha$. The signal light which has been transmitted in an optical transmission path 301 is first phase-modulated by $-\alpha$ at a phase modulator 410 in a receiver 400. The pseudo-random number generator 220 in the transmitter and the pseudo-random number generator 420 in the receiver make a synchronized operation and use the same algorithm. The signal light whose randomized phase $\alpha$ has been removed at the phase modulator 410 has only the phase $\Phi$ representing the signal. The signal interferes with the adjacent signal through a one-bit delay interferometer 430, and is detected by balanced two photodetectors 441 and 442. If the phase difference between arms of the one-bit delay interferometer 430 is set at 0, only either one of detectors 441 and 442 is detected because $\Phi$ is either 0 or $\pi$. Thus, the binary signals are judged. Because the differential signals between the detectors 441 and 442 are outputted from a differential amplifier 450, common noise can be removed and therefore low-noise output signal can be obtained.

As discussed in the first embodiment, the light is pulse-compressed by the use of the high-order soliton compression effect in the optical fiber 140. To achieve this, the soliton order N must be 2 or greater. The greater the soliton order N, the greater is the pulse compression effect. Although large N is preferable, practically, about 500 becomes an upper limit of N substantially due to various restrictions. As shown in (Equation 12), the soliton order N is determined by parameters of $\gamma$, $P_0$, $T_0$, and $\beta_2$. $\gamma$ is the parameter that indicates the Kerr effect of optical fiber and therefore is unable to be varied greatly. $P_0$ indicates the peak power and can be greatly varied by the use of various light sources and optical amplifiers. In general, the range of 0.1 W<$P_0$<10 kW is a substantial value. $T_0$ is the parameter which gives the pulse width. The shortest pulse width is given when an ultra-short pulse light source is used. The pulse width becomes long when a cw light source and an intensity modulator are used. From these conditions, in general, the range of 0.1 ps<$\Delta T$<1 ns is obtained. Although $\beta_2$ is a group-velocity dispersion of optical fiber and is feasible by various values, the range of –0.1 ps²/m<$\beta_2$<0 ps²/m is generally obtained. These numerical value ranges are mere rough target for practical use. The present invention may not always be restricted by these.

The present invention provides a method for realizing an essential light source with macroscopic light intensity for secure optical communications, whose security is guaranteed by the physical laws. The present invention is to provide an apparatus which is a key to achieve secure optical communications under realistic conditions and therefore has high industrial applicability.

What is claimed is:

1. An antisqueezed light generator constructed of an optical system, the system comprising:
   a laser light source;
   an intensity modulator that modulates output light from the laser light source into pulsed light (let $\Delta T$ denote a full width at half maximum with respect to a pulse time width in such event);
   an optical amplifier for amplifying the pulsed light (let $P_o$ denote a peak power after amplification);
   a first optical fiber that has an negative group-velocity dispersion at a operating wavelength $\lambda$ of the laser light source; and
   a second optical fiber with a smaller negative group-velocity dispersion in absolute value than that of the first optical fiber,
   wherein each parameter of $\Delta T$, $P_o$, and $\beta_2$ are set in such a manner that soliton order N, given by an equation $N^2=\gamma P_o T_o^2/|\beta_2|$ from a pulse width $T_o$ defined by $T_o=\Delta T/(2\times 0.88137)$, the group-velocity dispersion $\beta_2$ of the first optical fiber at the operating wavelength $\lambda$, and an nonlinear coefficient $\gamma$ of the first optical fiber at the $\lambda$, becomes 2 or more,
   a length of first optical fiber is set within a range of 60 to 150% of the fiber length $z_{opt}=z_o(0.32/N+1.1/N^2)$ determined from the soliton order N after each parameter is set and from the soliton period $z_0=(\pi/2)T_0^2/|\beta_2|$,
   a length of the second optical fiber is within a range from 1 km to 100 km, and
   the light whose noise is expanded in a phase direction is eventually outputted.

2. The antisqueezed light generator according to claim 1, wherein the optical pulse amplified by the optical amplifier is pulse-compressed during a propagation in the first optical fiber, has a peak power reinforced, and has the noise expanded in the phase direction during the continued propagation in the second optical fiber, and the light whose noise is expanded in the phase direction is eventually outputted.

3. The antisqueezed light generator according to claim 1, wherein the length of the second optical fiber is within a range from 2 km to 50 km.

4. The antisqueezed light generator according to claim 1, wherein each parameter is set within a range of 0.1 ps<$\Delta T$<1 ns, 0.1 W<$P_o$<10 kW, and –0.1 ps²/m<$\beta_2$<0 ps²/m, and an upper limit of the soliton order N is 500.

5. The antisqueezed light generator according to claim 1, further comprising a band-pass filter.

6. The antisqueezed light generator according to claim 1, further comprising a polarization controller.

7. The antisqueezed light generator according to claim 1, wherein the laser light source is a mode-locked laser and does not include the intensity modulator.

8. An antisqueezed light generator constructed of an optical system, the system comprising:
   a laser light source;
   an intensity modulator that modulates output light from the laser light source into pulsed light (let $\Delta T$ denote a full width at half maximum with respect to a pulse time width in such event);
   an optical amplifier for amplifying the pulsed light (let $P_o$ denote a peak intensity after amplification);
   a first optical fiber that has a negative group-velocity dispersion at an operating wavelength $\lambda$ of the laser light source;
   a polarizing beam splitter;
   a second optical fiber which has a smaller negative group-velocity dispersion in absolute value than that of the first optical fiber; and
   a Faraday mirror,
   wherein each parameter of $\Delta T$, $P_o$, and $\beta_2$ are set in such a manner that a soliton order N, given by an equation $N^2=\gamma P_o T_o^2/|\beta_2|$ from a pulse width $T_o$ defined by $T_o=\Delta T/(2\times 0.88137)$, a group-velocity dispersion $\beta_2$ of the first optical fiber 1 at the operating wavelength $\lambda$, and an nonlinear coefficient $\gamma$ of the first optical fiber at the $\lambda$, becomes 2 or more,
   a length of the first optical fiber is within a range of 60 to 150% of the fiber length $z_{opt}=z_o(0.32/N+1.1/N^2)$ determined from the soliton order N after each parameter is set and from a soliton period $z_0=(\pi/2)T_0^2/|\beta_2|$,
   a length of the second optical fiber is within a range from 1 km to 50 km, and
   after passing the polarizing beam splitter, the light is subsequently propagated in the second optical fiber, is converted into orthogonal polarization by the Faraday mirror, propagates backward in the second optical fiber, and is extracted into the output port of the polarizing beam splitter, separated from the input port which has originally come, and
   the light whose noise is expanded in a phase direction is eventually outputted.

9. The antisqueezed light generator according to claim 8, wherein the optical pulse amplified by the optical amplifier is pulse-compressed during a propagation in the first optical fiber, has a peak power reinforced,
   passes the polarizing beam splitter, is transmitted subsequently in the second optical fiber, is converted into orthogonal polarization by the Faraday mirror, propagates backward in the second optical fiber, has noise expanded in a phase direction while performing a round-trip transmission in the second optical fiber, and is extracted into the output port of the polarizing beam splitter, separated from the input port which has originally come, and
   the light whose noise is expanded in the phase direction is eventually outputted.

10. The antisqueezed light generator according to claim 8, wherein the length of the second optical fiber is within a range from 2 km to 30 km.

11. The antisqueezed light generator according to claim 8, wherein each parameter is set within a range of 0.1 ps<$\Delta T$<1 ns, 0.1 W<$P_o$<10 kW, and –0.1 ps²/m<$\beta_2$<0 ps²/m, and an upper limit of the soliton order N is 500.

12. The antisqueezed light generator according to claim 8, wherein a light path from the laser light source to the polarizing beam splitter is connected by polarization-maintaining fibers.

13. The antisqueezed light generator according to claim 8, further comprising a band-pass filter.

14. The antisqueezed light generator according to claim 8, further comprising a polarization controller.

15. The antisqueezed light generator according to claim 8, further comprising an isolator.

16. The antisqueezed light generator according to claim 8, wherein the laser light source is a mode-locked laser and does not include the intensity modulator.

\* \* \* \* \*